(12) United States Patent
Matsui et al.

(10) Patent No.: US 8,160,492 B2
(45) Date of Patent: Apr. 17, 2012

(54) WIRELESS NETWORK SYSTEM

(75) Inventors: Toshiaki Matsui, Koganei (JP); Hitoshi Utagawa, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 650 days.

(21) Appl. No.: 12/295,434

(22) PCT Filed: Mar. 30, 2007

(86) PCT No.: PCT/JP2007/057725
§ 371 (c)(1),
(2), (4) Date: Nov. 28, 2008

(87) PCT Pub. No.: WO2007/114522
PCT Pub. Date: Oct. 11, 2007

(65) Prior Publication Data
US 2009/0253370 A1 Oct. 8, 2009

(30) Foreign Application Priority Data
Mar. 31, 2006 (JP) .................................. 2006-101016

(51) Int. Cl.
*H04B 7/165* (2006.01)
(52) U.S. Cl. .............. 455/23; 455/73; 455/84; 455/101; 455/103; 455/132; 455/129; 455/20
(58) Field of Classification Search .................... 455/20, 455/73, 84, 23, 101, 103, 132, 129
See application file for complete search history.

(56) References Cited

U.S. PATENT DOCUMENTS
6,246,295 B1 * 6/2001 Matsui et al. .................... 331/99
2003/0224743 A1 * 12/2003 Okada et al. ................ 455/127.2
2005/0277443 A1 * 12/2005 Ozluturk .................... 455/562.1

FOREIGN PATENT DOCUMENTS
JP     11-31918     2/1999
(Continued)

OTHER PUBLICATIONS
U.S. Appl. No. 12/594,433, filed Oct. 2, 2009, Utagawa, et al.
(Continued)

*Primary Examiner* — Temesgh Ghebretinsae
*Assistant Examiner* — Md Talukder
(74) *Attorney, Agent, or Firm* — Oblon, Spivak, McClelland, Maier & Neustadt, L.L.P.

(57) ABSTRACT

A wireless communication device having extremely simple constitution is used, and a low-cost and low power consumption wireless network system with high-quality signals is provided. The wireless network system comprises a plurality of wireless communication devices (101) each comprising a radiating oscillator (1) configured to integrate a transistor into a microwave oscillating resonator to generate a negative resistance and to commonly use a function of an antenna (11), an intermediate frequency signal generating section (4) and a receiving signal detecting section (7). In the wireless network system, the wireless communication devices are arranged to face at a position, at least one of the wireless communication devices has an intermediate frequency signal generating section having a frequency band signal generating function different from that of others, the receiving signal detection section having a function that can discriminate and receive a frequency band different from that of others, a signal transmitted from the one wireless communication device is transmitted to the other facing wireless communication device, and the other facing wireless communication device receives and extracts the signal by the receiving signal detecting section.

8 Claims, 6 Drawing Sheets

FOREIGN PATENT DOCUMENTS

| | | |
|---|---|---|
| JP | 2000-261234 | 9/2000 |
| JP | 3146260 | 3/2001 |
| JP | 2001-251138 | 9/2001 |
| JP | 3355337 | 12/2002 |
| JP | 2003-198259 | 7/2003 |
| JP | 2003-244016 | 8/2003 |
| JP | 2005-348332 | 12/2005 |

OTHER PUBLICATIONS

Robert A. Flynt, et al., "Low Cost and Compact Active Integrated Antenna Transceiver for System Applications", IEEE Transacitons on Microwave Theory and Techniques, vol. 44, No. 10, Oct. 1996, pp. 1642-1649.

C.M. Montiel, et al., "A Self-Mixing Active Antenna for communication and Vehicle Indentification Applications", IEE Microwave Theory and Techniques, vol. 41 No. 10, Oct. 1993, pp. 333-336.

* cited by examiner

WIRELESS NETWORK SYSTEM

TECHNICAL FIELD

The present invention relates a wireless network system which relays and transmits various signals with high quality.

BACKGROUND ART

As a wireless communication system to transmit a wideband digital signal of video information or the like, with high quality, a wireless LAN or a wireless video transmitting system using a microwave or a millimeter wave is developed. Furthermore, from the standpoint of monitoring control in smaller factories or large-scale production facilities, anti-crime monitoring for facility, disaster-prevention monitoring for a depopulated region, and the like, a sensor network configuration using a wireless system is examined.

In a normal wireless communication device, a transmitter side performs a modulating process or the like at an intermediate frequency of several ten megahertz to several hundred megahertz, depending on situations, an intermediate frequency in a several-GHz band at which signal processing is performed, and synthesizes the signal with a signal from a local oscillator to convert (up-convert) the frequency of the resultant signal into a transmission frequency in, e.g., a 60-GHz band, and emits the signal from an antenna through an electric supply line. The receiving side amplifies a wireless frequency signal from a receiving antenna, synthesizes the amplified signal with a signal from the local oscillator to convert (down-convert) the frequency of the resultant signal into an intermediate frequency band, and then performs channel extraction and signal demodulation. In the configuration, a technical difficulty occurs with an increase in frequency, and problems such as deterioration of efficiency of a local oscillator which is requested for a high-stable and sufficiently large output and deterioration of efficiency of a wireless device, for example, a loss in a frequency converter are posed. Furthermore, an increase in cost prohibits significant wireless network from being practically used and popularized.

In contrast to this, an attempt at an active antenna in which an antenna and a wireless frequency circuit section are integrated to aim at a low cost and a configuration of a radiating oscillator in which amplifier element and an electromagnetic wave radiating structure are integrated with each other are proposed. The configuration of the radiating oscillator is very simple, and is expected to be able to be applied as a constituent part of a low-cost wireless network.

As configurations of the wireless network, Bluetooth which has been practically used and a series of IEEE802.11 wireless standards known as a name of Wi-Fi are known. On the other hand, although the speed is lower than hundred times the speed of the above configuration, ZigBee which is supposed to be able to configure a low-power-consumption network at a low cost is being popularized.

The ZigBee is a technique corresponding to the standard of IEEE802.15.4 and is attractive as a short-distance, low-speed wireless link. However, like the Bluetooth or the Wi-Fi, in terms of use of frequencies, the ZigBee is a 2.4-GHz-band wireless system which is considerably busy in recent years.

On the other hand, furthermore, when wide-band digital information transmission by a 60-GHz-band millimeter wave to at a high frequency is to be performed, if phase noise and frequency stability of a local oscillator of the frequency converter are not sufficient, a wide-band digital signal cannot be transmitted with high quality due to frequency drift and phase noise. In order to solve the problem, a self-heterodyne wireless communication device technique and a wireless system configuration technique based thereon are disclosed.

For example, in self-heterodyne schemes disclosed in Japanese Patent Application Laid-Open No. 2005-348332 (to be referred to as Patent Document 1 hereinafter) and Japanese Patent Application Laid-Open No. 2003-198259 (to be referred to as Patent Document 2 hereinafter), although a local oscillator used in a transmitter is inexpensive and has an unstable frequency, a frequency shift or phase noise generated by the local oscillator are completely canceled in signal detection, and it is confirmed that a signal is preferably transmitted to a millimeter-wave-band wireless LAN or a wireless video transmission system which severely requests phase noise and frequency stability.

Furthermore, in Japanese Patent Application Laid-Open No. 2003-244016 (to be referred to Patent Document 3 hereinafter), re-conversion of a frequency required when a wireless communication network system including an application of relay to another system is constituted, i.e., conversion into a wireless transmission frequency is performed again through a conversion process to an intermediate frequency. However, at this time, in order to cope with a problem of causing deterioration in quality of a wide-band digital signal by frequency drift and phase noise when performance for phase noise or frequency stability of a local oscillator of a frequency converter is not sufficient, a technique that constitutes a system that wirelessly supplies a high-stable reference signal is disclosed.

Japanese Patent No. 3146260 (to be referred to as Patent Document 4 hereinafter), Japanese Patent No. 3355337 (to be referred to as Patent Document 5 hereinafter), and Non-patent Document 1 "R. A. Flynt, J. A. Navarro and K. Chang, 'Low Cost and Compact Active Integrated Antenna Transceiver for System Application', IEEE Trans. Microwave Theory Tech., Vol. 44, pp. 1642 to 1649, 1996" disclose an example of a radiating oscillator constituted by a structure of a planar resonator using a transistor as a negative resistance amplifier. Non-patent Document 1 discloses a configuration of a two-way communication apparatus in which radiating oscillators are arranged such that facing transmission/reception signals are orthogonal polarized waves and which is operated as a receiver by a mixer diode for frequency conversion.

In Non-patent Document 2 "C. M. Montiel, L. Fan and K. Chang, 'A Self-Mixing Active Antenna for Communication and Vehicle Identification Applications', 1996IEEE MTT-S Digest, TU4C pp. 333 to 336, 1996" discloses a technique in which a gun diode is used as an oscillation element, a high-frequency voltage is superposed on a bias voltage of the gun diode to cause frequency modulation, the modulated frequency is irradiated on a gun diode oscillator manufactured like the gun diode to cause an injection synchronization phenomenon, at the same time, the frequency modulation component is transmitted to another radiating oscillator, and, although two-way transmission and reception cannot be simultaneously performed by a mixer operation of the gun diode itself, a high-frequency signal component can be communicated.

As described above, a sensor network which avoids a large number of unsolved problems such as a problem of interference with a existing busy wireless system and problems of interference and coexistence by a high-density arrangement of wireless devices and which covers a large number of observation points in a wide region, a new wireless device technique to realize a simple wireless communication network, a wireless network configuration technique using the wireless device technique are almost developed.

However, in a conventional wireless device technique and a conventional wireless network configuration technique, a configuration is complicated to increase the cost accordingly, and poses a problem with respect power consumption or signal quality. The problem considerably obstructs practical use and popularization of a wireless network.

The present invention has been made to solve the above problems, and has as its object to provide a microwave-band-to-millimeter-wave-band wireless network system which uses a very simple configuration as a configuration of a basic wireless communication device and is suitable for a low-cost and low-power-consumption wireless network system configuration with high-quality signals.

DISCLOSURE OF THE INVENTION

The invention is as follows.

(1) A wireless network system which relays and transmits various signals to each other comprises a plurality of wireless communication devices each comprising, a radiating oscillator configured to integrate a transistor into a microwave oscillating resonator to generate a negative resistance and to commonly use a function of an antenna which emits an electromagnetic wave to a space, an intermediate frequency signal generating section which outputs an intermediate frequency signal to the radiating oscillator and a receiving signal detecting section which receives a transmitted signal, wherein the wireless communication devices are arranged to face at a position where pull-in phenomenon are generated each other, at least one of the wireless communication devices has an intermediate frequency signal generating section having a frequency band signal generating function different from that of others, the receiving signal detection section having a function that can discriminate and receive a frequency band different from that of others, a signal transmitted from the one wireless communication device is transmitted to the other facing wireless communication device, and the other facing wireless communication device receives and extracts the signal by the receiving signal detecting section.

(2) In the wireless network system described in (1), each of the wireless communication devices has one directional beam or a plurality of directional beams.

(3) In the wireless network system described in (1) or (2), each of the intermediate frequency signal generating sections and each of the receiving signal detecting sections of the wireless communication devices commonly use the same frequency band to each other.

(4) In the wireless network system described in any one of (1) to (3), at least one of the each of the radiating oscillators of the wireless communication devices is subjected to a frequency stabilizing function.

(5) In the wireless network system described in any one of (1) to (4), each of the intermediate frequency signal generating sections of the wireless communication devices has a function of superposing a unique address signal and is configured to make it possible to discriminate a signal generated from any wireless communication device.

(6) In the wireless network system described in any one of (1) to (5), each of the intermediate frequency signal generating sections of the wireless communication devices has a function of connecting signals from various sensors or another sensor network to transfer acquired data of the signals.

(7) In the wireless network system described in any one of (1) to (6), the wireless network system is connected to another cable or wireless communication network to be integrally controlled and managed.

According to the present invention, the radiating oscillators arranged in each of the wireless communication devices is synchronized with each other in operation states. When a signal is input from the intermediate frequency signal generating section in one radiating oscillator, the signal is frequency-converted (up-converted) in the radiating oscillator, and the signal is transmitted as a side wave in a wireless transmission frequency band and commonly used as a wireless network. At this time, in the radiating oscillator having a receiving signal detecting section in a frequency band being equal to the intermediate frequency signal, the signal is frequency-converted (down-converted) and received. Signals of different intermediate frequencies transmitted by another radiating oscillator is similarly frequency-converted (up-converted), transmitted as a side wave of a frequency different from that of the side wave in the wireless transmission frequency band, and received by a radiating oscillator having a receiving signal detecting section of a frequency band corresponding to a new intermediate frequency. In the wireless network system according to the present invention, since a local oscillation frequency in frequency conversion is synchronized, very high-quality two-way transmission is secured without influence of phase noise or frequency drift. In a planar radiating oscillator configured to cause a transistor to satisfy a negative resistance oscillation condition, high efficiency 20 to 30 times the efficiency obtained by using a gun diode can be expected, and low power consumption can be achieved. For this reason, a wireless communication device which can also operate by a battery and which serves as a low-cost constituent part can be provided. Therefore, a wireless network system can be expected to be practically used.

A configuration of a radiating oscillator and an emitter structure arranged in the wireless communication device are selected to shape an output beam into a one-side-direction, two-way, and multibeam shapes, and the beams are combined to each other to freely form a network configuration obtained by arranging radiating oscillators. For this reason, the network configuration is practically used for formation of wireless links, under complex installation conditions, such as a large number of sensor networks, security networks, and communication control networks, and can be provided as an applied technology to many sides. In particular, formation of a millimeter-wave-band wireless network by a module having a highly directional beam avoids a problem of interference with another wireless system, is suitable for frequency coexistence, and is effective for effective utilization of frequency resources.

Furthermore, between the radiating oscillators in which the same frequency band is commonly used by the intermediate frequency signal generating section and a receiving signal detecting section which are connected to a radiating oscillator constituting a wireless network system, a signal from any one of the radiating oscillators can be commonly used and can be effectively used depending on a functional purpose of the wireless network system.

In addition, a configuration in which frequency stability of the wireless network system according to the present invention can be held within a technically required condition, and even though a specific wireless link is interrupted, the frequency stability is maintained is secured.

An address of each of the radiating oscillator is written to make it possible to easily discriminate signal information from which place of the wireless network system according to the present invention.

The wireless network systems according to the present invention are connected to each other or connected to a network of another type, so that a larger number of functions are expected to be effected.

A network system in which a plurality of wireless network configurations according to the present invention are bundled and connected to a cable or another wireless communication network to be integrally controlled and managed as an upper system can be achieved.

BEST MODE FOR CARRYING OUT THE INVENTION

An embodiment of the present invention will be described below with reference to the accompanying drawings.

Figure 1:
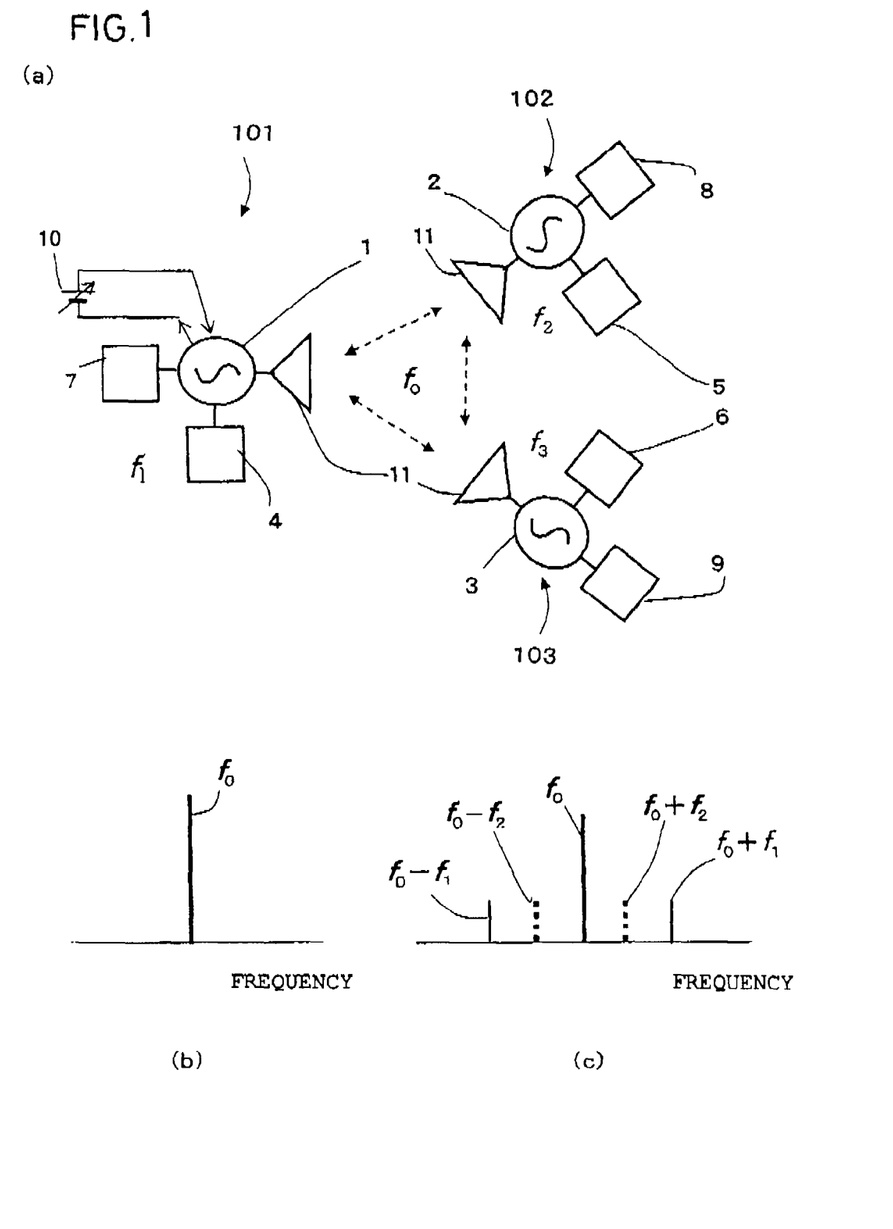
FIG. 1 is a block diagram showing a principle of a wireless network system according to the present invention.

FIG. 1 is a block diagram showing a principle of a wireless network system according to the present invention. The present invention is a wireless network system which relays and transmits various signals to each other, as shown in FIG. 1(a), and which comprises a plurality of wireless communication devices 101 each comprising a radiating oscillator 1 configured to integrate a transistor into the microwave oscillating resonator to generate a negative resistance and to commonly use a function of an antenna 11 which emits an electromagnetic wave to a space, an intermediate frequency signal generating section 4 which outputs an intermediate frequency signal to the radiating oscillator 1 and a receiving signal detecting section 7 which receives a transmitted signal. In the wireless network system shown in FIG. 1(a), the wireless communication devices 101, 102, and 103 are arranged to face at a position where pull-in phenomena are generated each other, at least one of the wireless communication devices 101, 102, and 103 has an intermediate frequency signal generating section having a frequency band signal generating function different from that of others, the receiving signal detection section can discriminate and receive a frequency band different from that of others, a signal transmitted from the one wireless communication device 101 is transmitted to the other facing wireless communication devices 102 and 103, and the other facing wireless communication devices 102 and 103 receive and extract the signal by receiving signal detecting sections 8 and 9.

In FIG. 1(a), in the radiating oscillator 1, a transistor connected to a resonant structure also serving as the antenna 11 is arranged, and the transistor is configured to generate a negative resistance at a DC bias voltage supplied from a DC bias power supply 10. Energy supplied from the DC bias power supply 10 is converted into high-frequency oscillation energy by the radiating oscillator 1 and emitted from the antenna 11 to a space. Radiating oscillators 2 and 3 shown in FIG. 1(a) are basically the same as the radiating oscillator 1. However, a description about the DC bias power supply 10 in FIG. 1(a) is omitted. The radiating oscillators 1, 2, and 3 respectively arranged in the wireless communication devices 101, 102, and 103 are arranged to face each other. The radiating oscillators oscillate at a common frequency to by a pull-in phenomenon of an oscillation frequency and are phase-synchronized with each other. Signal frequency bands of intermediate frequency signal generating sections 4, 5, and 6 respectively connected to the radiating oscillators 1,2 and 3 are $f_1$, $f_2$, and $f_3$, respectively. The receiving signal detecting section has a function of being able to discriminate and receive different frequency bands, and a signal transmitted by one radiating oscillator can be transmitted to the other facing radiating oscillator and extracted by the receiving signal detecting section. FIG. 1(b) shows a frequency spectrum obtained when an input from the intermediate frequency signal generating section is absent. Furthermore, a frequency spectrum commonly used by a wireless network when inputs from the intermediate frequency signal generating sections 4 and 5 respectively connected to the radiating oscillator 1 and the radiating oscillator 2 are present and when an input from the intermediate frequency signal generating section 6 connected to the radiating oscillator 3 is absent is as shown in FIG. 1(c).

In this state, the signal frequency bands from the radiating oscillator 1 and the radiating oscillator 2 can be discriminated, identified from each other, and received.

Figure 2:
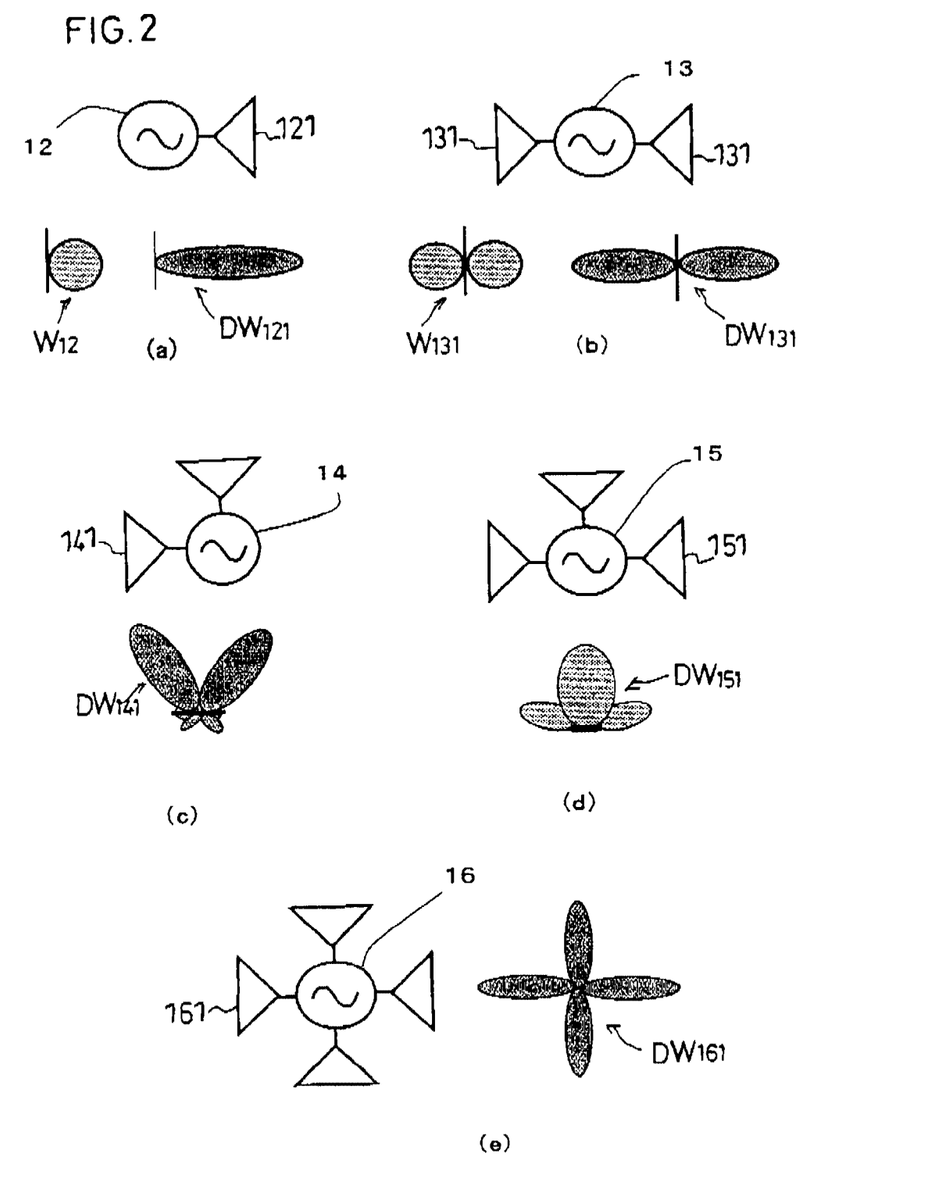
FIG. 2 is an explanatory diagram related to a radiating oscillator serving as a constituent element of the wireless network system according to the present invention and having one directional beam or a plurality of directional beams.

FIG. 2 is an explanatory diagram related to a configuration in which a radiating oscillator serving as a constituent element of the wireless network system according to the present invention has one directional beam or a plurality of directional beams. FIG. 2(a) shows a configuration of a radiating oscillator 12 having an emitting pattern in a one-side direction. The radiating oscillator 12 emits an electromagnetic wave of a wide-angle emitting pattern $W_{121}$ having a low directivity by using an antenna 121 having a fairly standard planar antenna structure. The radiating oscillator 12 can emit an electromagnetic wave of an emitting pattern $DW_{121}$ having a higher directional gain by using an additional means such as a lens or a horn. FIG. 2(b) is a conceptual diagram related to a radiating oscillator 13 having a bidirectional emitting characteristic. When a normal slot type resonator (antennas 131, 131) or the like is used, a bidirectional emitting pattern $W_{131}$ can be easily realized. When the radiating oscillator 12 is constituted by using the additional means, a directional gain of an emitting pattern $W_{131}$ can be increased as in an emitting pattern $DW_{131}$.

FIGS. 2(c), 2(d), and 2(e) show configurations of radiating oscillators 14, 15, and 16 which emit electromagnetic waves of multi-beam patterns. The radiating oscillator 14 in FIG. 2(c) expresses a wireless device constituted by a radiating oscillator which realizes a configuration which emits an electromagnetic wave of an emitting pattern $DW_{141}$ having high directional gains in two predetermined directions as in a wireless device in which antennas 141 are attached in two directions at a predetermined angle by combining a additional structure to the antenna section to determine the emitting pattern and by adding deformation to the antenna section. FIG. 2(d) expresses a case in which a wireless device in which an antenna also serving as a resonator of the radiating oscillator 15 is transformed into a shape different from that in FIG.

2(c) or added with a different additional structure to constitute a wireless communication device having beams in three directions, and expresses a wireless device having an emitting pattern $DW_{151}$ having directional gains in three predetermined direction as if antenna 151 are attached in three directions at predetermined angles. Similarly, when a radiating oscillator having an emitting pattern of a two-direction beam in FIG. 2(c) is used as a both-side emitting type oscillation device, a wireless device having a 4-direction beam emitting characteristic shown in FIG. 2(e) can be realized. In this case, the radiating oscillator 16 operates as a wireless device having a high-directional emitting pattern $DW_{161}$ in four predetermined directions, and the radiating oscillator 16 emits an electromagnetic wave in the respective directions and can interact with the wireless communication devices in the respective directions to make it possible to form a wireless link. Any of the radiating oscillators 14, 15, and 16 can be realized by using characteristics generated by a plurality of arrangements of slot structures and patch structures used in an antenna technique.

The emitting patterns in FIGS. 2(a) to 2(e) illustrate concepts of emitting patterns of electromagnetic waves from the radiating oscillator serving as a constituent element of the wireless network system according to the present invention. In the present invention, it is possible to combine and general multi-beam antenna patterns or wide-angle emitting patterns to combine various electromagnetic wave emitting pattern configuration techniques including a cubic configuration as a matter of course.

Figure 3:
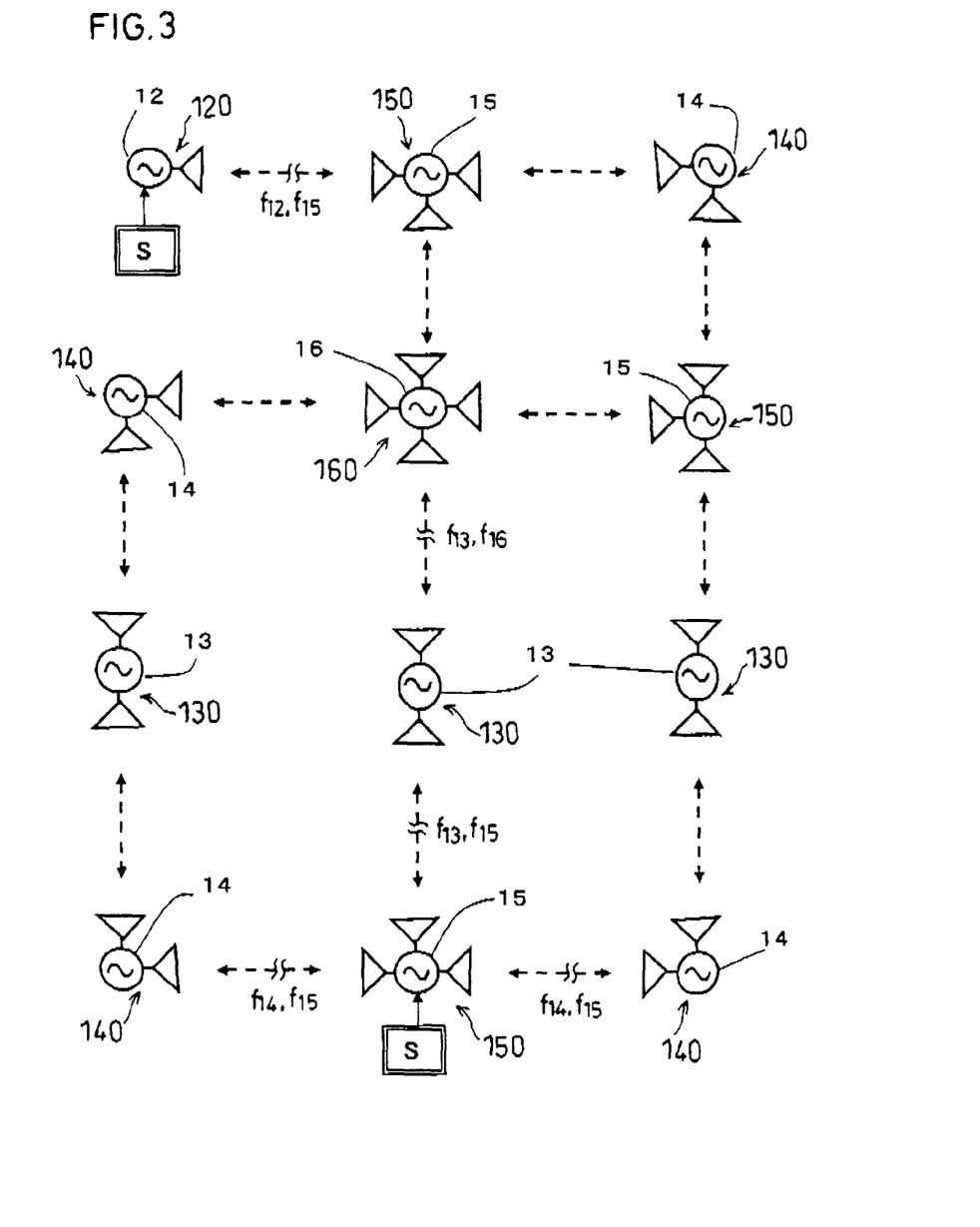
FIG. 3 is a diagram showing a configuration example of the wireless network system according to the present invention.

FIG. 3 is a diagram showing a configuration example of a wireless network system according to the present invention, Wireless communication devices 120 to 160 constituting the wireless network system in FIG. 3 are constituted by the radiating oscillators 12 to 16 shown in FIGS. 2(a) to 2(e). The wireless communication devices 120 to 160 basically has the same configuration as that of the wireless communication device 101 in FIG. 1(a). However, descriptions related to the intermediate frequency signal generating section, the receiving signal detecting section, and the DC bias power supply in the drawings are omitted for convenience.

The wireless network system in FIG. 3, in order to hold the frequency stability within a condition requested by technical standards, shows an example of an arrangement obtained when a frequency stabilizing function is performed by a frequency stabilizing means S. According to this configuration example, the radiating oscillators 12 to 16 constituting the wireless communication devices 120 to 160 oscillate at a common frequency $f_0$ and are phase-synchronized. In this state, signals in intermediate frequency bands $f_{12}$ to $f_{16}$ are up-converted and extracted by the receiving signal detecting section when another wireless communication device has the same intermediate frequency band. The frequency stabilizing means is required to allow the radiating oscillators 12 to 16 to secure a frequency stability falling within an allowance range for a wireless device by the frequency stabilizing means S. The frequency stabilizing means S is connected to at least one of the wireless communication devices constituting the wireless network system to make it possible to maintain frequency stability. As in the configuration example in FIG. 3, since the frequency stabilizing means S is arranged for the plurality of radiating oscillators, when the wireless network system is partially interrupted by an accident or the like, for example, even though a network between the wireless communication devices 120 and 150 is interrupted, a high stability of the oscillation frequency $f_0$ of the wireless communication device constituting the wireless network is secured.

Note that the wireless communication device constituting the wireless network system according to the present invention has a high efficiency and can be operated by a low power supply of several ten mW or less. Therefore, a power transmission means by microwave or an electric power generating system such as a solar battery or an energy conversion system or a miniaturized light-weight power supply means such as a small battery, for example, a lithium battery or a hydrogen battery is used in place of a DC bias power supply to supply a small electric power of 10 mW to 20 mW to each of the wireless communication devices to make it possible to continuously operate the wireless network system according to the present invention. This is advantageous to a wireless device installed at a place where power supply is difficult.

Since an address is described in a radiating oscillator constituting a wireless network system, a signal information from which place of the wireless network system according to the present invention can be easily discriminated. The wireless network systems according to the present invention are connected to each other or the wireless network system is connected to a network of another type to expect that various functions are exerted.

A concrete example of a basic circuit of a wireless communication device constituting the wireless network system according to the present invention and an examination result of an operation principle of the basic circuit will be described below.

Figure 4:
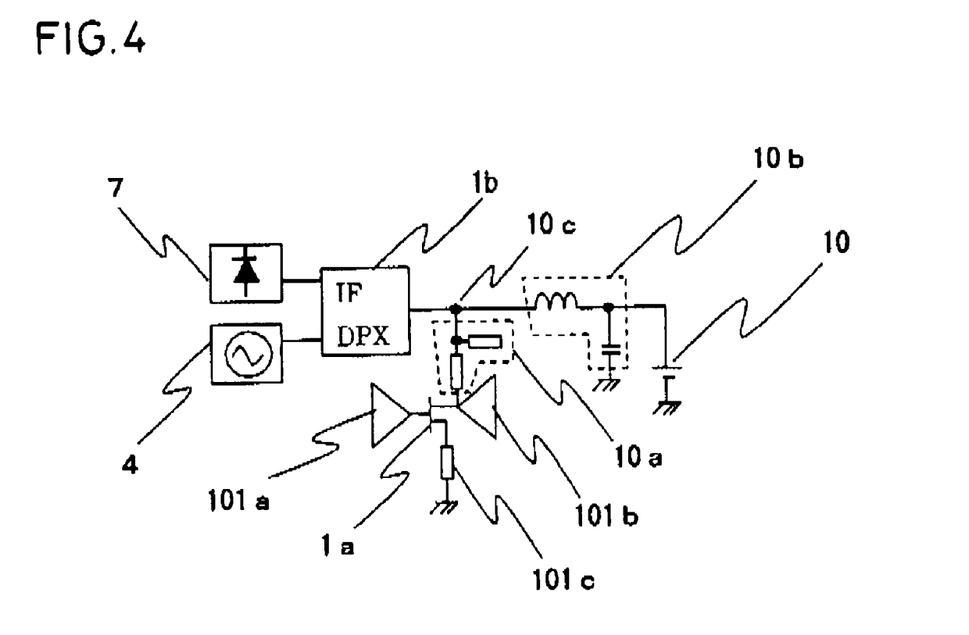
FIG. 4 is a concrete example of a basic circuit of a wireless communication device constituting the wireless network system according to the present invention.

FIG. 4 is a concrete example of the basic circuit of the wireless communication device constituting the wireless network system according to the present invention. A conductive patch 101a is connected to the gate of a transistor 1a, a conductive patch 101b and an RF choke circuit 10a for supplying drain voltage are connected to the drain, and an IF choke circuit 10b is connected in series between the RF choke circuit 10a and the DC bias power supply 10. The source is grounded through the impedance line 101c which satisfies an oscillation condition. The receiving signal detecting section 7 and the intermediate frequency signal generating section 4 are connected to a connection point 10c between the RF choke circuit 10a and the IF choke circuit 10b through a diplexer 1b to discriminate a transmitting IF signal and a receiving IF signal from each other.

An operation principle experiment result of the wireless communication device will be described below.

Figure 5:
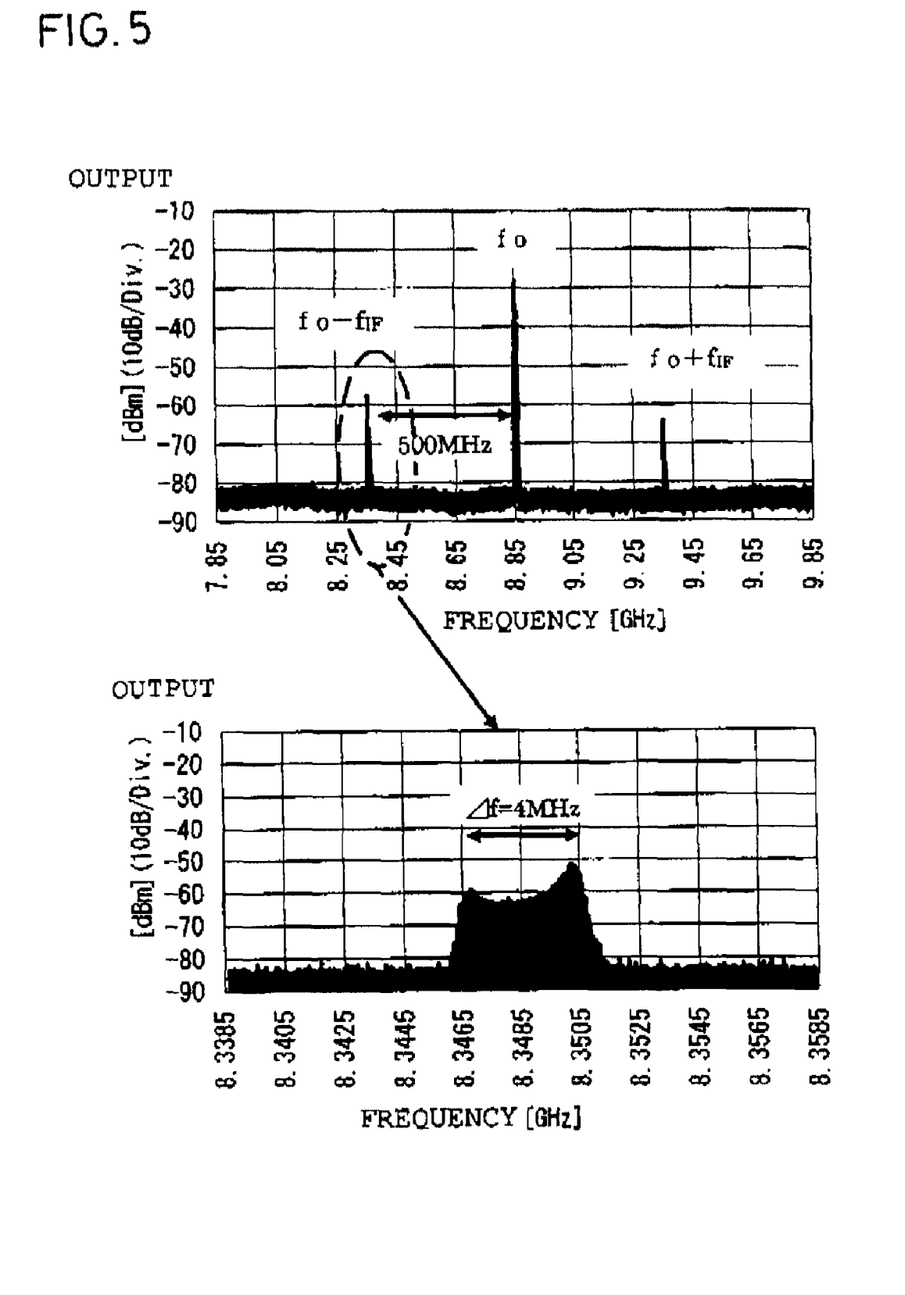
FIG. 5 shows an RF emitting signal obtained when an AM signal having an IF frequency $f_{IF}$=500 MHz is generated in an intermediate frequency signal generating section 4.

An RF emitting signal obtained when an AM signal (sine wave, modulation frequency fm=50 kHz) having an IF frequency $f_{IF}$=500 MHz is generated in the intermediate frequency signal generating section 4 is shown in FIG. 5. This RF emitting signal is actually measured by a spectrum analyzer. In this case, an IF signal is up-converted by mixing by a radiating oscillator itself in which an oscillation frequency of the radiating oscillator is set to a local signal frequency, and converted into an RF emitting signal. Therefore, frequency components of $f_0-f_{IF}$ and $f_0+f_{IF}$ are generated to the oscillation frequency $f_0$ of the radiating oscillator.

A drain voltage Vd of the transistor 1a at is changed at fm=50 kHz by a change in amplitude of an AM signal, a change $\Delta f$=4 MHz of the RF oscillation frequency is generated accordingly. A frequency of 8.3505 GHz corresponds to a peak of a sine modulation wave, and a frequency of 8.3465 GHz corresponds to a trough of the sine modulation wave.

Figure 6:
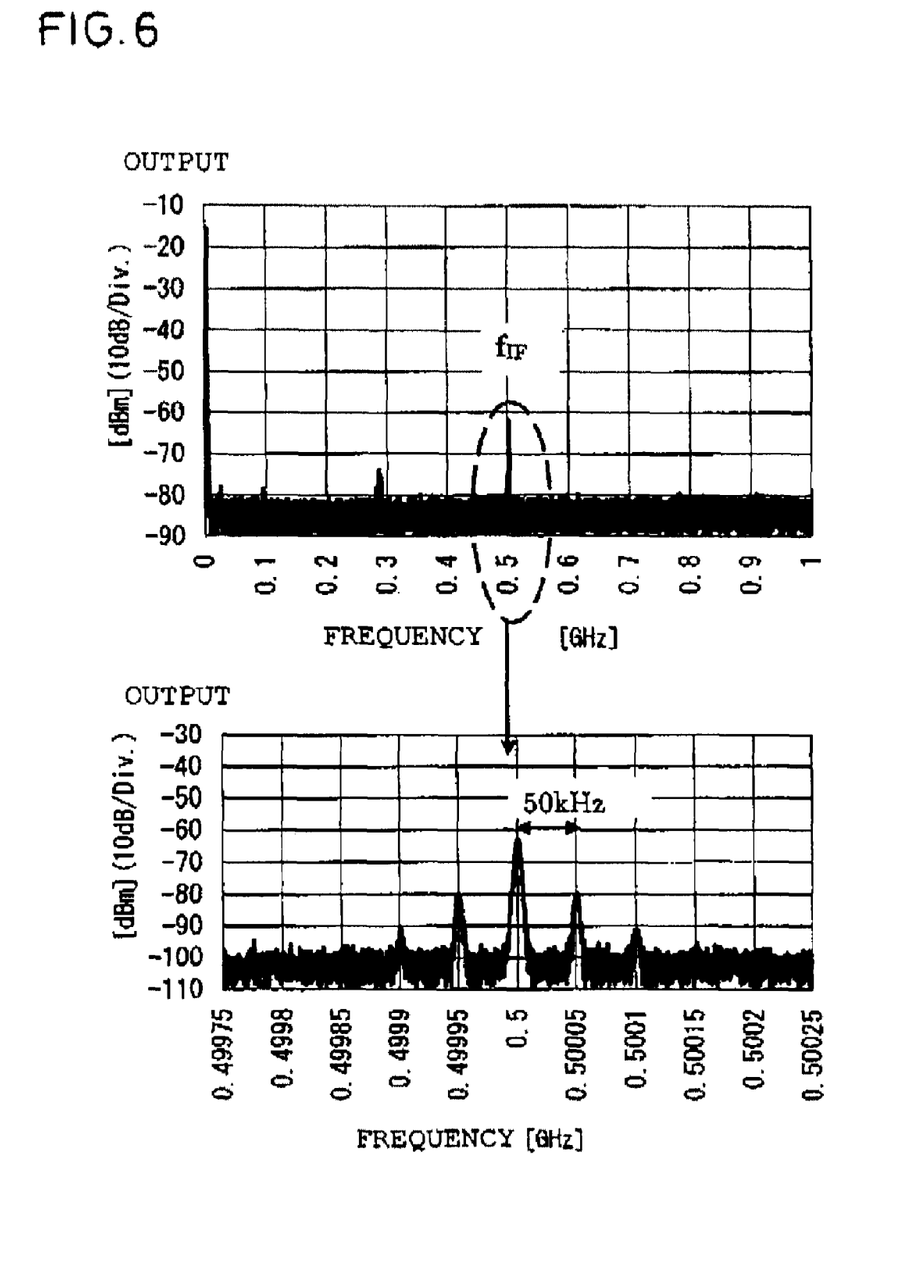
FIG. 6 shows a receiving IF signal obtained when two wireless communication devices each having the circuit shown in FIG. 4 are prepared to face each other, and a signal emitted from one of the wireless communication device shown in FIG. 5 is received by the other wireless communication device and down-converted.

A receiving IF signal obtained when two wireless communication devices each having the circuit shown in FIG. 4 are prepared to face each other, and the signal in FIG. 5 emitted from one of the wireless communication device is received and down-converted by the other wireless communication device is shown in FIG. 6.

As described above, although a fluctuation in frequency given by Δf=4 MHz occurs in the RF signal, the two wireless communication devices are synchronized with each other by a pull-in phenomenon of the oscillation frequency. Therefore, in the receiving IF signal shown in FIG. 6, the fluctuation in frequency given by Δf=4 MHz shown in FIG. 5 and phase noise are canceled, an original AM signal (sine wave, modulation frequency fm: 50 kHz) is reproduced, and a receiving IF signal is obtained. This receiving IF signal is detected by the receiving signal detecting section 7. The IF signal in this example is an AM signal. However, the IF signal operates in the same manner as even in FM modulation, and a modulating method is not specifically limited.

INDUSTRIAL APPLICABILITY

As described above, in a wireless network system according to the present invention, since a local oscillation frequency in frequency conversion is synchronized, very high-quality two-way transmission is secured without an influence of phase noise or frequency drift. The wireless network system is suitable for wireless communication in a microwave band to a millimeter wave band. Since the wireless network system according to the present invention can be constituted by using a very simple configuration as the configuration of a basic wireless communication device, a low cost and a low power consumption can be achieved.

The invention claimed is:

1. A wireless network system which relays and transmits various signals to each other comprising:
   a plurality of wireless communication devices each including:
   a radiating oscillator having a configuration of a transistor integrated with a microwave resonator for oscillation, which generates a negative resistance, and commonly gives an antenna function of emitting an electromagnetic wave to a space;
   an intermediate frequency signal generating section which outputs an intermediate frequency signal to the radiating oscillator; and
   a receiving signal detecting section which receives a transmitted signal, wherein
   the wireless communication devices are arranged to face at a position where pull-in phenomenon are generated between each other,
   at least one of the wireless communication devices has an intermediate frequency signal generating section having a frequency band signal generating function different from that of the other wireless communication devices,
   the receiving signal detection section having a function that can discriminate and receive a frequency band different from that of the other wireless communication devices, and
   a signal transmitted from the one wireless communication device is transmitted to another facing wireless communication device which is synchronized with the signal transmitted by a pull-in phenomenon, and the other facing wireless communication device receives and extracts the signal by the receiving signal detecting section.

2. The wireless network system according to claim 1, wherein at least one of each of the radiating oscillators of the wireless communication devices is subjected to a frequency stabilizing function.

3. The wireless network system according to claim 1, wherein
   each of the wireless communication devices has one directional beam or a plurality of directional beams.

4. The wireless network system according to claim 2, wherein
   each of the intermediate frequency signal generating sections and each of the receiving signal detecting sections of the wireless communication devices commonly use the same frequency band as each other.

5. The wireless network system according to claim 3, wherein
   each of the intermediate frequency signal generating sections of the receiving signal detecting sections of the wireless communication devices commonly use the same frequency band as each other.

6. The wireless network system according to any one of claims 1 to 3, wherein
   each of the intermediate frequency generating sections of the wireless communication devices has a function of superposing a unique address signal and is configured to make it possible to discriminate a signal generated from each wireless communication device.

7. The wireless network system according to any one of claims 1 to 3, wherein
   each of the intermediate frequency signal generating sections of the wireless communication devices has a function of connecting a signal from various sensors of another sensor network to transfer acquired data of the signal.

8. The wireless network system according to claim 1, wherein
   the wireless network system is connected to another cable or wireless communication network to be integrally controlled and managed.

* * * * *